UNITED STATES PATENT OFFICE.

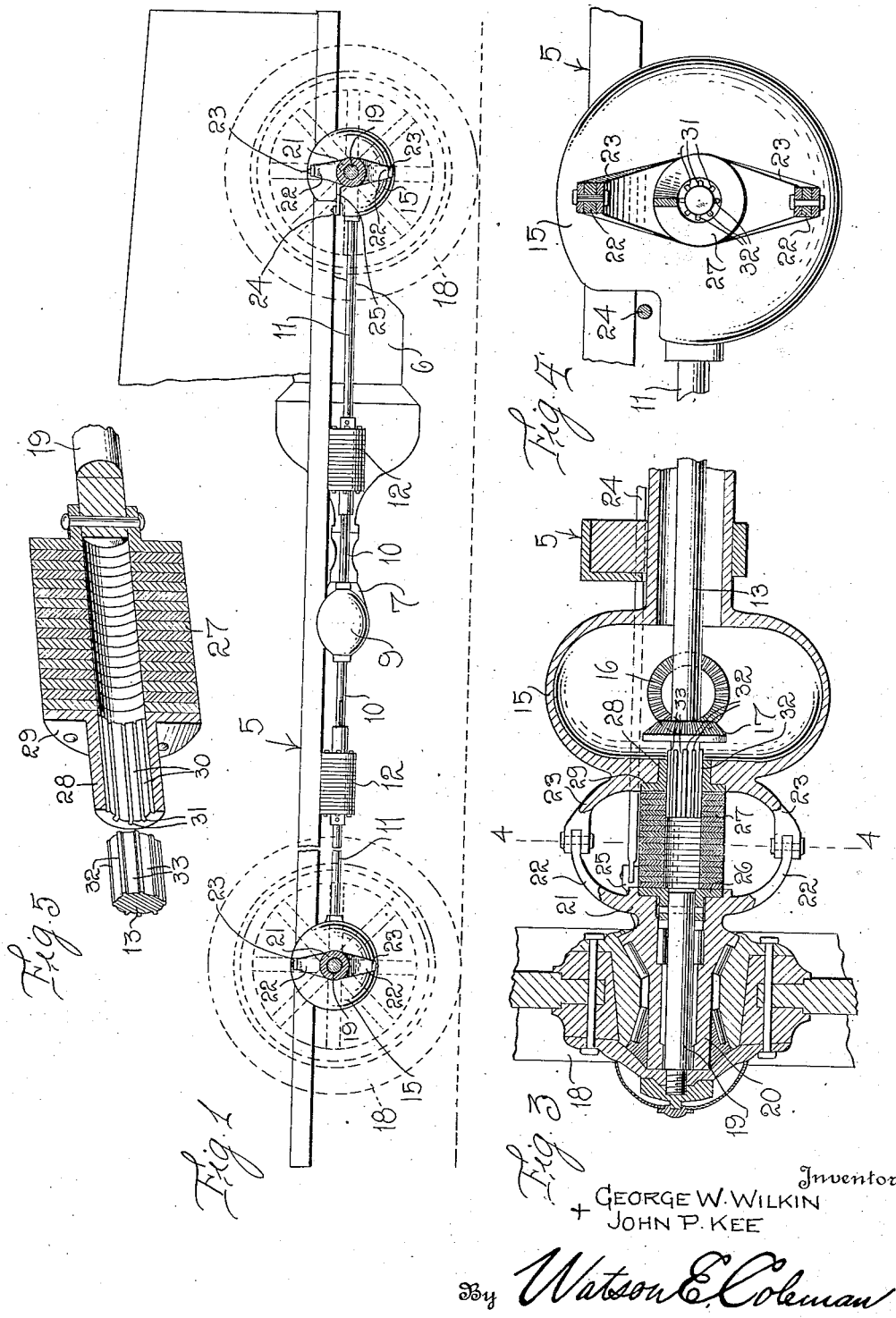

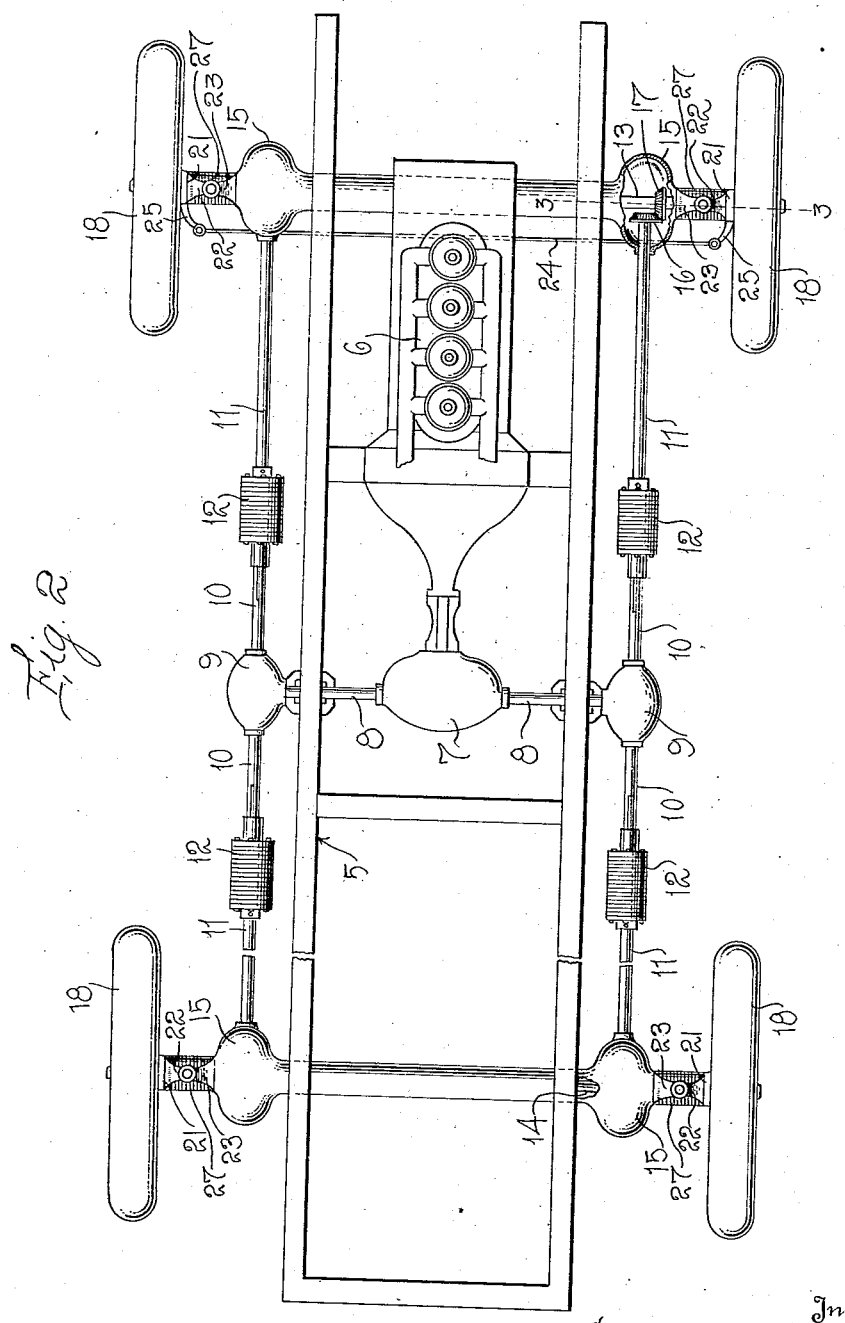

GEORGE W. WILKIN AND JOHN P. KEE, OF GRANGEVILLE, IDAHO.

FOUR-WHEEL DRIVE FOR MOTOR-VEHICLES.

1,304,640. Specification of Letters Patent. Patented May 27, 1919.

Application filed January 23, 1918. Serial No. 213,352.

*To all whom it may concern:*

Be it known that we, GEORGE W. WILKIN and JOHN P. KEE, citizens of the United States, residing at Grangeville, in the county of Idaho and State of Idaho, have invented certain new and useful Improvements in Four-Wheel Drives for Motor-Vehicles, of which the following is a specification, reference being had to the accompanying drawings.

This invention relates to an improved four wheel drive for motor vehicles, and has for its primary object to provide simple, effective and reliable means for affording a continuous application of power to both the front and rear wheels of the vehicle and which will also permit of the turning movement of the individual wheels to relatively different angles with respect to the vehicle body.

It is also an important object of the invention to provide an improved mounting of the vehicle wheels and connection of the same to independently driven axles so that a maximum of tractive effort may be obtained and liability of the wheels skidding or slipping will be reduced to a minimum.

It is also one of the more particular objects of the invention to provide an elastic universally movable driving connection between the driven axle and the wheel which will effectually prevent the transmission of road shocks and jars to the engine or the body of the vehicle.

With the above and other objects in view the invention consists in the improved construction, combination and arrangement of the several parts as will be hereinafter more fully described subsequently claimed and illustrated in the accompanying drawings in which similar reference characters designate corresponding parts throughout the several views and wherein;

Figure 1 is a side elevation of a motor vehicle constructed in accordance with the preferred embodiment of the invention;

Fig. 2 is a top plan view partly in section;

Fig. 3 is an enlarged vertical section taken on the line 3—3 of Fig. 2;

Fig. 4 is a section taken on the line 4—4 of Fig. 3; and

Fig. 5 is a sectional perspective view of the elastic spring connection between the wheel spindle and the driven axle of the vehicle.

Referring in detail to the drawings, 5 designates the chassis or frame of a motor vehicle upon which an engine 6 of any approved type is securely mounted. 7 designates the main differential gearing through which the power is transmitted to the shaft sections 8. Supplementary differential gearings indicated at 9 are provided at the outer ends of the shaft sections 8 and transmit power through differentially driven shafts to the front and rear vehicle axles. Each of these latter shafts includes two sections designated 10 and 11 respectively which are elastically coupled together for relative angular movement by means of a closely coiled flat spring plate 12. The particular construction of this elastic shaft connection or joint, constitutes the subject matter of a separate pending application and will not therefore be herein further described in detail, particularly in view of the fact that this connection between the differential shaft sections is quite similar to the elastic connection between the wheel spindles and the driven axles of the vehicle to be subsequently related.

The pairs of front and rear wheel axles designated 13 and 14 respectively are independently driven by the differential power transmission shafts on the relatively opposite sides of the machine and as this driving means for the several wheel axles is identical in each case, the following description of one of the wheel drives will suffice for all. The wheel axle is suitably mounted in the vehicle frame and extends through a housing or casing 15. This casing is provided with a bearing support for the shaft section 11 to which a beveled gear 16 is fixed. This gear meshes with a similar gear 17 secured upon the wheel axle.

18 designates the vehicle wheel which is suitably secured to a spindle 19 extending through the bearing sleeve or thimble 20 which is integrally formed with the yoke 21. Suitable roller bearings may be interposed between the wheel hub and the thimble and between the thimble and the wheel spindle 19, either as illustrated in the accompanying drawing or in any other approved manner. The yoke 21 is formed with the upper and lower inwardly projecting arms 22. These arms 22 are pivotally connected to the ends of similar arms 23 which are formed upon the housing 15. 24 designates the steering rod actuated in any approved manner and connected to an arm 25 fixed to the yoke 21.

The inner end of the spindle 19 is secured within a laterally projecting annular flange formed upon the plate indicated at 26. To one side of this plate, one end of a closely coiled elastic or spring metal plate 27 is fixed. To the other end of the coil spring 27, the flange 29 formed on one end of a sleeve 28 is secured. The inner wall of this sleeve is formed with the alternate ribs or keys 30 and grooves 31. The end of the driven axle 13 is formed with complementary ribs or keys 32 and grooves 33 whereby the sleeves 28 will be held upon the axle against relative rotation but capable of a longitudinal shifting movement with respect thereto. By means of this elastic connection between the wheel spindle and the driven axle, the wheel is capable of a universal angular movement with respect to the axle. By the provision of the differentially driven power transmission shafts, each wheel receives the maximum driving effort of the engine under the peculiar conditions of grade or road surface which may be encountered by the particular wheel. All shocks or jars in passing over rocks or other obstructions are instantly absorbed in the elastic driving connections 27 for the individual wheels and the engine is not subjected to violent shock or jar which might possibly result in derangement of its parts. Also a maximum tractive effort is obtained from each wheel so that the slipping or skidding of the wheels is obviated.

From the foregoing description taken in connection with the accompanying drawings, the construction, manner of operation and several advantages of our invention will be clearly and fully understood. The machine as a whole is quite simple in its construction and efficient in operation and can be incorporated in various types of vehicle constructions, at comparatively small cost. Thus the device can be used in connection with traction engines, as well as pleasure and commercial motor driven vehicles.

While we have herein shown and described the preferred form, construction and arrangement of the several parts of the device, it is to be understood that the same are susceptible of considerable modifications therein and we therefore reserve the privilege of adopting all such legitimate changes as may be fairly embodied within the spirit and scope of the invention as claimed.

Having thus fully described our invention, what we desire to claim and secure by Letters Patent is:—

1. In a motor vehicle, a driven axle, a wheel supporting spindle normally in axial alinement with said axle and mounted for angular movement relative thereto, and means operatively connecting the driven axle to said spindle, said means yieldably maintaining the spindle in alinement with the axle and being capable of transmitting rotation to the wheel in any angular position of said spindle against the tractive resistance of the wheel.

2. In a motor vehicle, a driven axle, a wheel supporting spindle normally in axial alinement with said axle and mounted for angular movement with respect thereto, and a single instrumentality constituting a driving connection between the axle and said spindle capable of a flexing movement in the angular movement of the spindle and operating to continuously transmit rotation to the wheel against the tractive resistance offered thereby.

In testimony whereof we hereunto affix our signatures in the presence of two witnesses.

GEORGE W. WILKIN.
JOHN P. KEE.

Witnesses:
 GRANT A. GREEN,
 J. J. LAMM.